(12) United States Patent
Roussel et al.

(10) Patent No.: US 6,721,866 B2
(45) Date of Patent: Apr. 13, 2004

(54) UNALIGNED MEMORY OPERANDS

(75) Inventors: Patrice Roussel, Portland, OR (US); Eric Sprangle, Portland, OR (US); Glenn J. Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 10/029,367

(22) Filed: Dec. 21, 2001

(65) Prior Publication Data

US 2003/0120889 A1 Jun. 26, 2003

(51) Int. Cl.[7] .............................................. G06F 12/04
(52) U.S. Cl. ....................................................... 711/201
(58) Field of Search ......................................... 711/201

(56) References Cited

U.S. PATENT DOCUMENTS

| | | | |
|---|---|---|---|
| 3,916,388 A | * 10/1975 | Shimp et al. ............... 711/201 |
| 4,814,976 A | * 3/1989 | Hansen et al. .............. 711/201 |
| 5,577,200 A | * 11/1996 | Abramson et al. ............ 714/50 |
| 5,627,773 A | 5/1997 | Wolrich et al. ........ 364/715.03 |
| 6,112,297 A | * 8/2000 | Ray et al. .................... 712/225 |

* cited by examiner

Primary Examiner—Kevin L. Ellis
(74) Attorney, Agent, or Firm—Fish & Richardson P.C.

(57) ABSTRACT

A method of obtaining an operand from a memory device includes reading a first operand from a first location in a memory device, the first operand including part of the operand specified by an instruction, shifting the first operand by a first shift amount, reading a second data operand from the memory device, the second operand having part of the operand specified by the instruction, shifting the second operand by a second shift amount, and combining the first shifted data entry and the second shifted data entry to produce an aligned operand, wherein shifting the first operand and shifting the second operand is performed by a shifter also used for floating point functions.

24 Claims, 6 Drawing Sheets

UNALIGNED MEMORY OPERANDS

BACKGROUND

This invention relates to processing un-aligned operands.

A system architecture describes the mode of operation of a processor and mechanisms provided to support operating systems and includes system-oriented registers and data structures, and system-oriented instructions.

Introduction of a single-instruction, multiple-data (SIMD) technology to a system architecture provides for parallel computations on data contained in registers. SIMD provides enhanced performance to a processor in, for example, advanced media, image processing and data compression applications.

DETAILED DESCRIPTION

Figure 1:
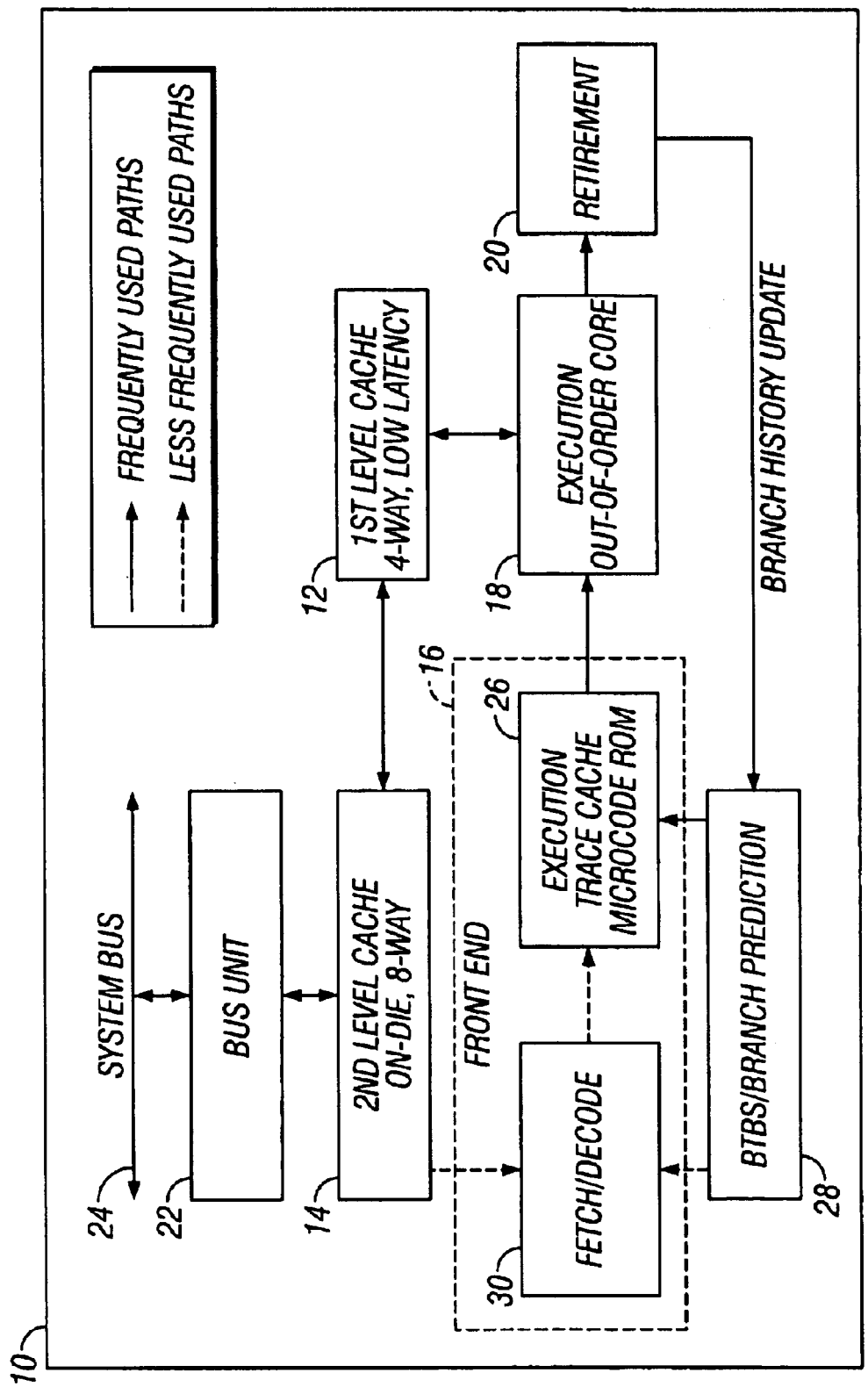
FIG. 1 is a block diagram of a processor.

Referring to FIG. 1 a processor 10 is shown. The processor 10 is a three way super scalar, pipelined architecture. Using parallel processing techniques, the processor 10 is able on average to decode, dispatch, and complete execution of (retire) three instructions per clock cycle. To handle this level of instruction throughput, the processor 10 uses a decoupled, twelve stage pipeline that supports out of order instruction execution. The micro architecture pipeline of the processor 10 is divided into four sections, i.e., a first level cache 12 and a second level cache 14, a front end 16, an out of order execution core 18, and a retire section 20. Instructions and data are supplied to these units through a bus interface unit 22 that interfaces with a system bus 24. The front end 16 supplies instructions in program order to the out of order core 18 that has very high execution bandwidth and can execute basic integer operations with one-half clock cycle latency. The front end 16 fetches and decodes instructions into simple operations called micro-ops ($\mu$-ops). The front end 16 can issue multiple $\mu$-ops per cycle, in original program order, to the out of order core 18. The front end 16 performs several basic functions. For example, the front end 16 performs prefetch instructions that are likely to be executed, fetch instructions that have not already been prefetched, decode instructions into micro operations, generates micro code for complex instructions and special purpose code, delivers decoded instructions from an execution trace cache 26, and predicts branches using advanced algorithms in a branch prediction unit 28.

The front end 16 of the processor 10 is designed to address some common problems in high-speed, pipelined microprocessors. Two of these problems, for example, contribute to major sources of delays. These are the time to decode instructions fetched from the target and wasted decode bandwidth due to branches or branch target in the middle of cache lines.

The execution trace cache 26 addresses both of these issues by storing decoded instructions. Instructions are fetched and decoded by a translation engine (not shown) and built into sequences of $\mu$-ops called traces. These traces of $\mu$-ops are stored in the trace cache 26. The instructions from the most likely target of a branch immediately follow the branch without regard for continuity of instruction addresses. Once a trace is built, the trace cache 26 is searched for the instruction that follows that trace. If that instruction appears as the first instruction in an existing trace, the fetch and decode of instructions 30 from the memory hierarchy ceases and the trace cache 26 becomes the new source of instructions.

The execution trace cache 18 and the translation engine (not shown) have cooperating branch prediction hardware. Branch targets are predicted based on their linear addresses using Branch Target Buffers (BTBS) 28 and fetched as soon as possible. The branch targets are fetched from the trace cache 26 if they are indeed cached there; otherwise, they are fetched from the memory hierarchy. The translation engine's branch prediction information is used to form traces along the most likely paths.

The core 18 executes instructions out of order enabling the processor 10 to reorder instructions so that if one $\mu$-op is delayed while waiting for data or a contended execution resource, other $\mu$-ops that are later in program order may proceed around it. The processor 10 employs several buffers to smooth the flow of $\mu$-ops. This implies that when one portion of the pipeline experiences a delay, that delay may be covered by other operations executing in parallel or by the execution of $\mu$-ops which were previously queued up in a buffer.

The core 18 is designed to facilitate parallel execution. The core 18 can dispatch up to six $\mu$-ops per cycle; note that this exceeds the trace cache 26 and retirement 20 $\mu$-op bandwidth. Most pipelines can start executing a new $\mu$-op every cycle, so that several instructions can be processed any time for each pipeline. A number of arithmetic logical unit (ALU) instructions can start two per cycle, and many floating point instructions can start one every two cycles. Finally, $\mu$-ops can begin execution, out of order, as soon as their data inputs are ready and resources are available.

The retirement section 20 receives the results of the executed $\mu$-ops from the execution core 18 and processes the results so that the proper architectural state is updated according to the original program order. For semantically correct execution, the results of instructions are committed in original program order before it is retired. Exceptions may be raised as instructions are retired. Thus, exceptions cannot occur speculatively. They occur in the correct order, and the processor 10 can be correctly restarted after execution.

When a $\mu$-op completes and writes its result to the destination, it is retired. Up to three $\mu$-ops may be retired per cycle. A ReOrder Buffer (ROB) (not shown) in the retirement section 20 is the unit in the processor 10 which buffers completed $\mu$-ops, updates the architectural state in order, and manages the ordering of exceptions.

The retirement section 20 also keeps track of branches and sends updated branch target information to the BTB 28 to update branch history. In this manner, traces that are no longer needed can be purged from the trace cache 26 and new branch paths can be fetched, based on updated branch history information.

Figure 2:
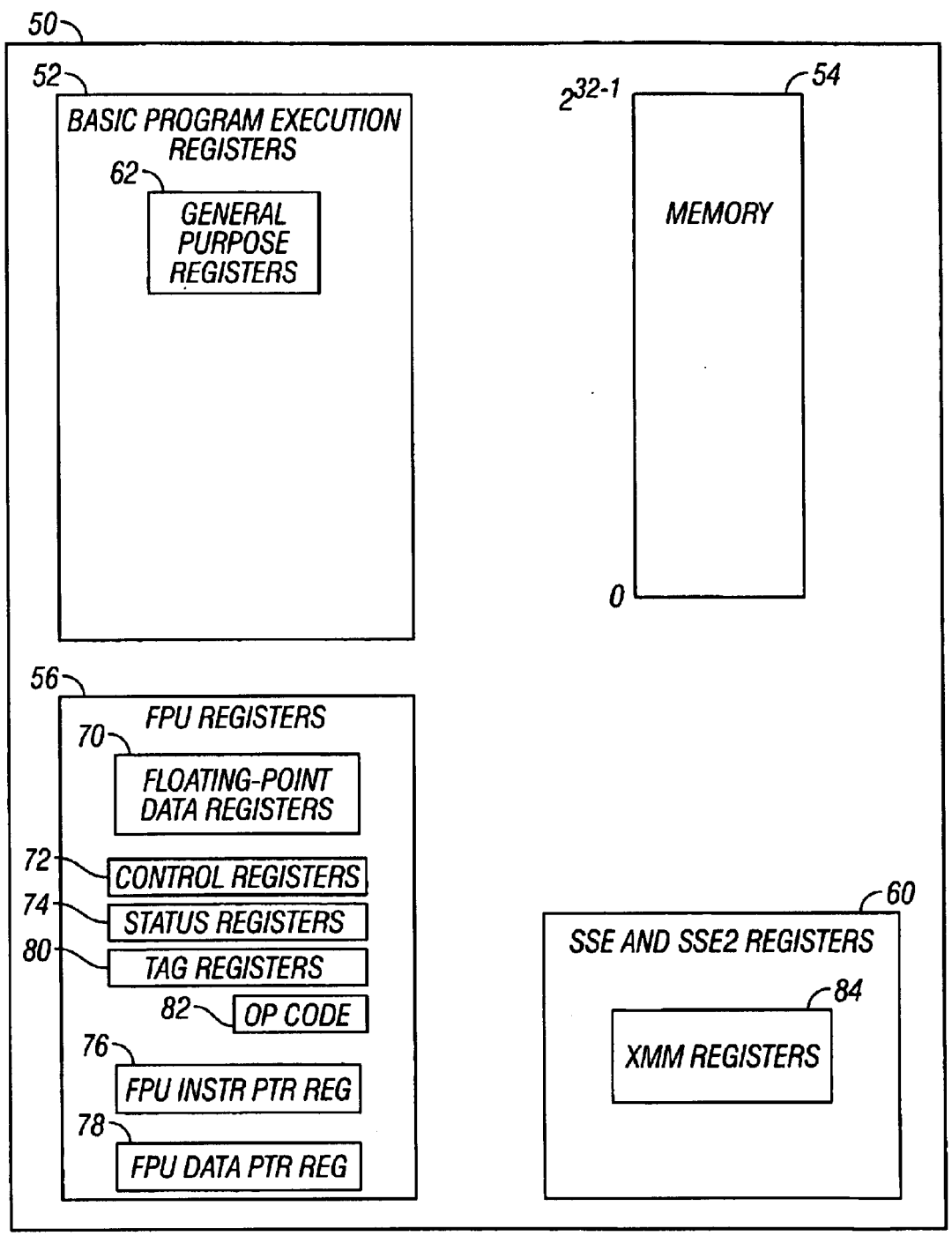
FIG. 2 is a block diagram of an executive environment.

Referring to FIG. 2, an execution environment 50 is shown. Any program or task running on the processor 10 (of FIG. 1) is given a set of resources for executing instructions and for storing code, data, and state information. These resources make up the execution environment 50 for the processor 10. Application programs and the operating system or executive running on the processor 10 use the execution environment 50 jointly. The execution environment 50 includes basic program execution registers 52, an addressable memory 54, Floating Point Unit (FPU) registers 56, and XMM registers 84, that are used by SSE and SSE2 (SSE refers to "Streaming SIMD Extensions"). There are eight XMM registers 84 and they are all 128-bits wide.

Any task or program running on the processor 10 can address a linear address space in memory 54 of up to four gigabytes ($2^{32}$ bytes) and a physical address space of up to 64 gigabytes ($2^{36}$ bytes).

The basic program execution registers 52 include eight general purpose registers 62. The basic program execution registers 52 provide a basic execution environment in which to execute a set of general purpose instructions. These instructions perform basic integer arithmetic on byte, word, and doubleword integers, handle program flow control, operate on bit and byte strengths, and address memory.

The FPU registers 56 include eight FPU data registers 70, an FPU control register 72, a status register 74, an FPU instruction pointer register 76, an FPU operand (data) pointer register 78, an FPU tag register 80 and an FPU op code register 82. The FPU registers 56 provide an execution environment for operating on single precision, double precision, and double extended precision floating point values, word-, doubleword, and quadword integers, and binary coded decimal (BCD) values.

The SSE and SSE2 registers 60 provide an execution environment for performing SIMD operations on 128-bit packed single precision and double precision floating point values and on 128-bit packed byte, word, doubleword and quadword integers.

Figure 3:
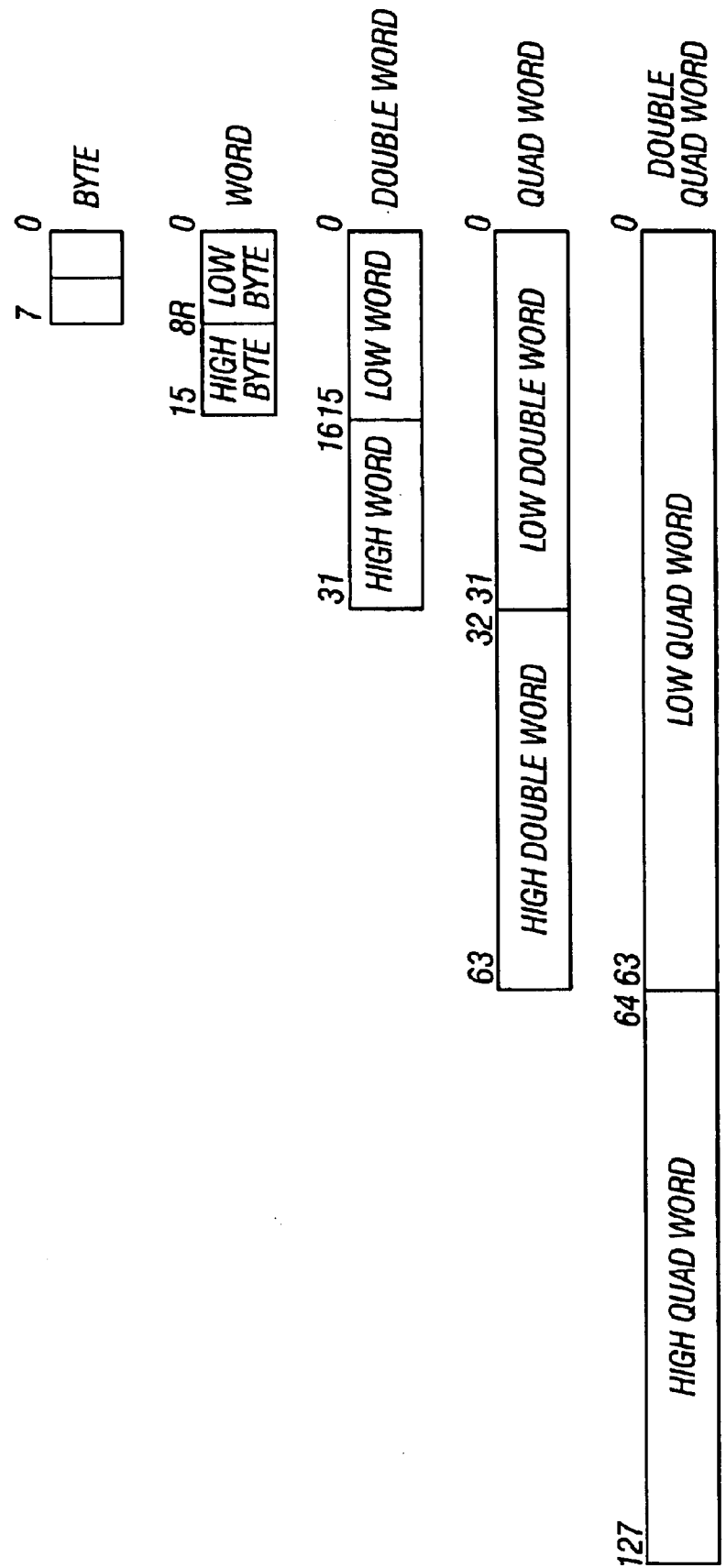
FIG. 3 is a diagram of a byte order fundamental data type.

Referring to FIG. 3, a byte order of each of the fundamental data types when referenced as operands in memory 54 (or cache 12 or cache 14) is shown. The size of the fundamental data types used in the processor 10 are bytes, words, doublewords, quadwords and double quadwords. A byte is eight bits, a word is two bytes (16-bits), a doubleword is four bytes (32-bits), a quad word is eight bytes (64-bits), and a double quadword is sixteen bytes (128-bits).

Figure 4A:
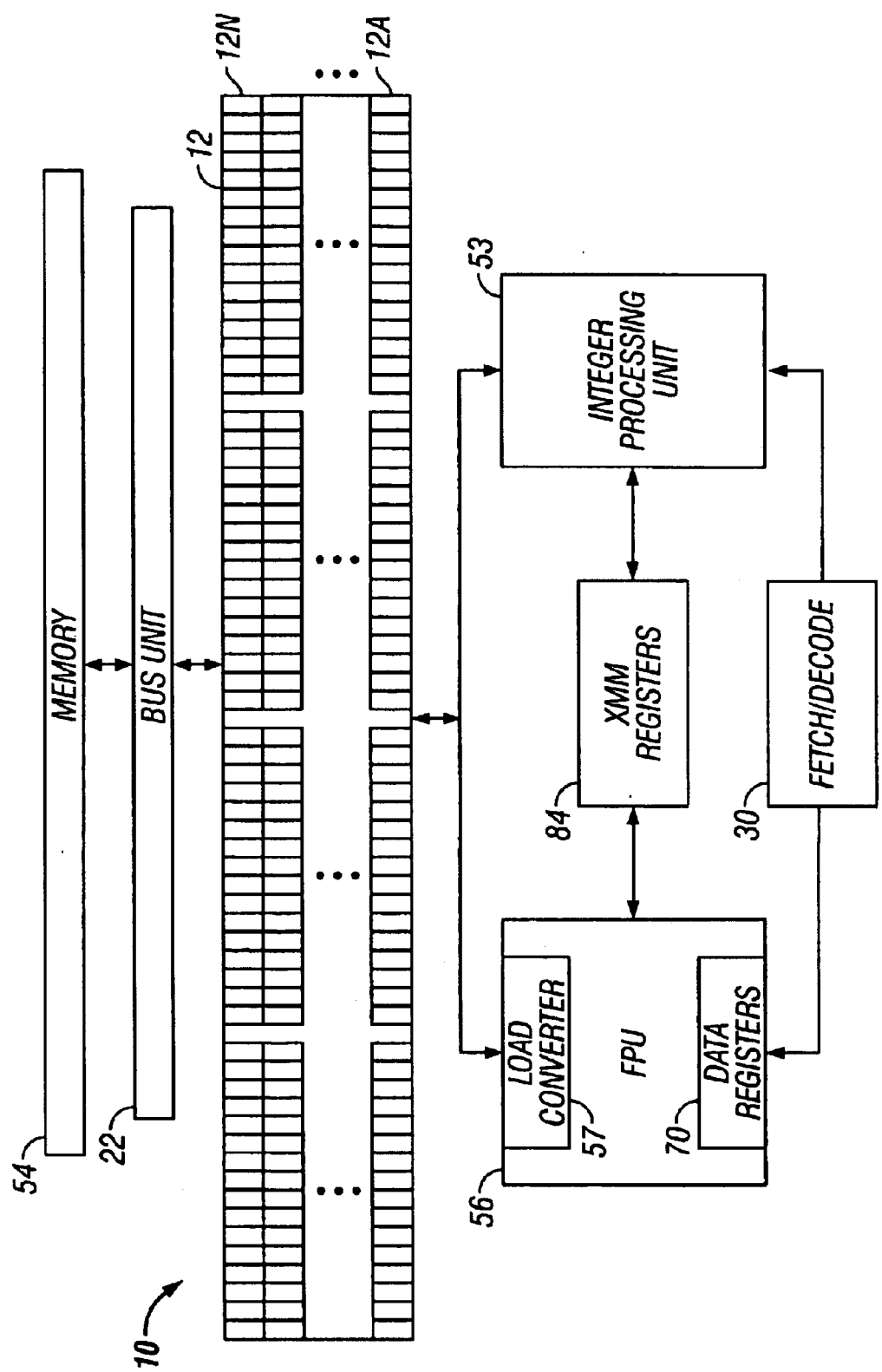
FIG. 4A is a block diagram showing portions of the processor of FIG. 1.

Referring to FIG. 4A, portions of processor 10 are shown, including FPU 56 and an Integer Processing Unit (IPU) 53. Processor 10 includes several executable instructions, including instructions that cause the transfer of data between memory 54, cache 12 (or cache 14) and the various registers included in environment 50. Both FPU 56 and IPU 53 can read and write operands from and to memory 54 through bus unit 22, and through an intermediate cache 12 (or cache 14, as shown in FIG. 1). IPU 53 is configured to perform arithmetic operations on operands as integers, for example, adding, subtracting and complementing operands as signed/un-signed integers. FPU 56 is configured to operate on floating-point operands that include three fields: a sign, an exponent and a significand to specify each floating-point number. FPU includes data registers 70 for holding the three fields for the FPU operands being processed by FPU 56. In order to add or subtract two floating point operands, FPU 56 must align the radix point of each operand, that is, making the exponent portion of each floating-point operand equal before the significand are added or subtracted. A load converter 57, included in FPU 56, includes a shifting function that may be used to shift operands. Processor 10 also includes data cache 12 that has 64-byte cache lines, 12a–12n.

Processor 10 includes several instructions that may be executed by processor 10 and are defined at an architectural level. For example, a programmer or user of processor 10 may select an instruction that includes an LDDQU instruction, which is an instruction that when executed causes a 128-bit unaligned operand to be obtained from cache 12. At a micro-architectural level, each instruction, such as LDDQU instruction, causes the fetch/decode unit 30 to issue a series of $\mu$-ops that cause the operation specified by the instruction to be processed by one or more logic blocks of processor 10. In the case of the LDDQU instruction, the micro-architecture causes several uops to be performed, including two uop loads (hereafter referred to as "uloads"). Each of the two uloads performed by the LDDQU instruction cause the loading of an aligned 128-bit operands from cache 12.

In processor 10, several different operand sizes may be loaded with a uload including un-aligned uloads that may be byte-length, word-length, double-word-length and quad-word-length. Processor 10 also includes a double-quad-word length uload (128-bits long) that may only be performed as an aligned load from data cache 12. Therefore, to perform the LDDQU instruction, which specifies a 128-bit un-aligned operand in data cache 12, LDDQU causes the execution of two uloads, both of which are 128-bit aligned uloads.

The LDDQU instruction also causes a shift of each aligned operand loaded from data cache 12, and merges the two shifted operands to form the required result (i.e., the operand specified at the un-aligned address). The two aligned uloads from data cache 12 are performed by a memory logic block (not shown), while the processing (shifting and merging) of the data obtained from the uloads is performed by the load converter 57 of FPU 56.

As shown below, a LDDQU instruction specifies both a destination register (typically an XMM register) for storing the aligned operand, and a memory address for reading the operand from cache 12. The LDDQU instruction has the following format:

LDDQU destination, memory address

As an example, the following LDDQU instruction specifies the loading of an operand that begins at address XX02, and specifies the aligned operand is to be stored in register XMM7:

LDDQU XMM7, ADDRESS1;
(ADDRESS1=xxxx xxxx xxxx xx02)

Each LDDQU instruction causes the fetch/decode unit 30 to issue a series of $\mu$-ops (uOP1–uOP4) shown below.

uOP1: LOAD_ALIGN_LOW, TMP_LOW, ADDRESS1
(SHIFT RIGHT #BYTES=LSB4 of ADDRESS1)
uOP2: MOVE TMP_ADD, ADDRESS1
uOP3: LOAD_ALIGN_HIGH, TMP_HIGH, TMP_ADD+15
(SHIFT LEFT #BYTES=(15–LSB4 of (TMP_ADD+15))
uOP4: OR XMM7, TMP_LOW, TMP_HIGH
Where:
TMP_LOW refers to a first 128-bit temporary register;
TMP_HIGH refers to a second 128-bit temporary register;
TMP_ADD refers to a 32-bit temporary register; and
"+15" is the address increment for the second aligned load, LOAD_ALIGN_HIGH.

Figure 4B:
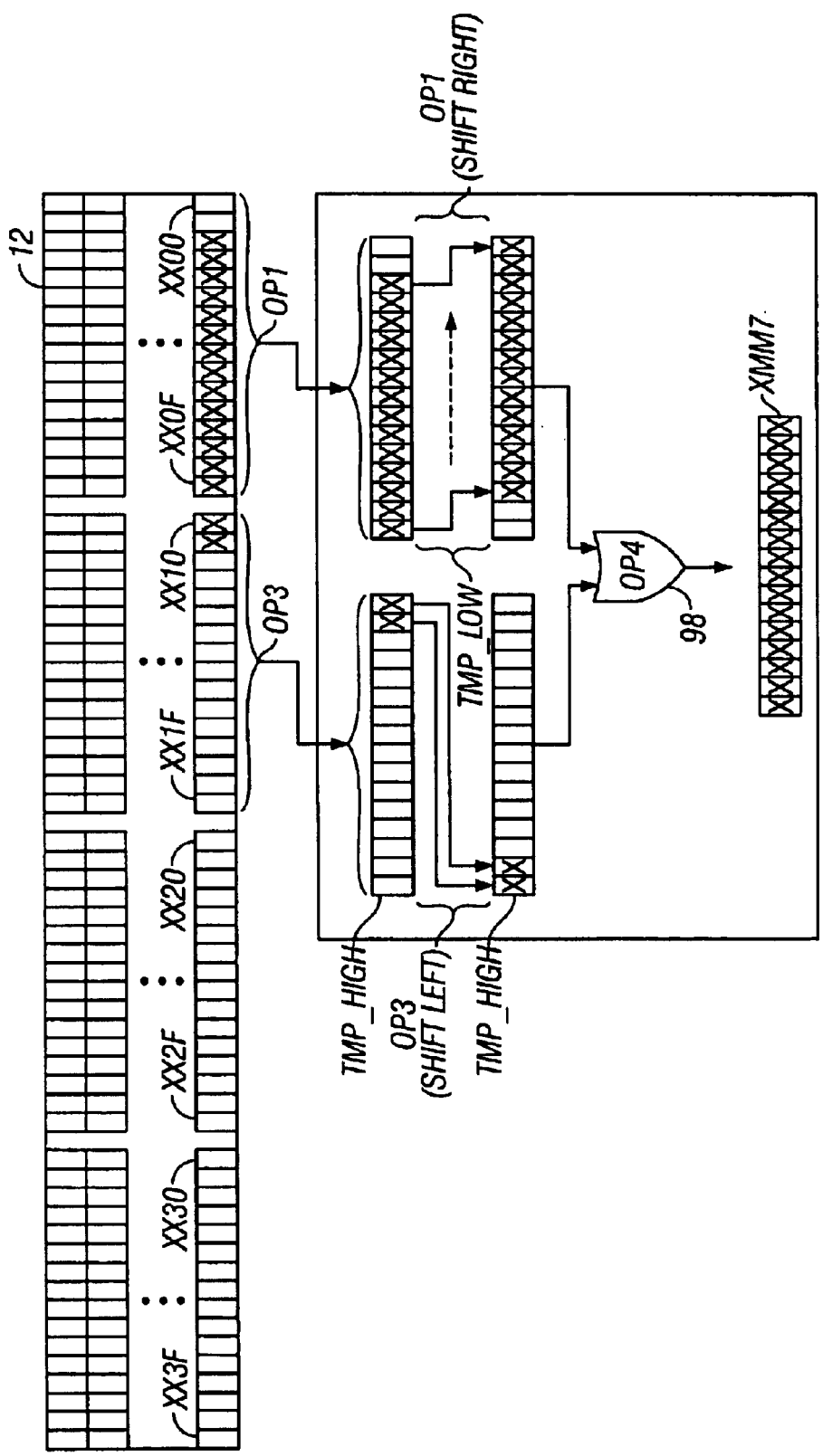
FIG. 4B is a block diagram showing two aligned operands that are merged into a single operand.

The execution of uOP1–uOP4 is depicted in FIG. 4B. uOP1 (LOAD_ALIGN_LOW) loads a first 128-bit operand from a single cache line of cache 12, and uOP3 (LOAD ALIGN HIGH) loads a second 128-bit operand from a single cache line of cache 12, with the un-aligned operand specified by the LDDQU instruction being contained within the first and second operands. As shown in FIG. 4B, uOP1 and uOP3 each load a single 128-bit aligned operand from data cache 12 to temporary registers, TMP_LOW and TMP HIGH, respectively. uOP1 (LOAD ALIGN LOW) and uOP3 (LOAD_ALIGN_HIGH) are both decoded and executed to load 16-byte aligned operands from cache 12. Therefore, the four least significant bits (LSB4) of "ADDRESS1" and "TMP ADD+15" used by uOP1 and uOP3, respectively, are ignored by data cache 12 when determining the operand address. For example, if ADDRESS1 equals XX02 (hex), uOP1 (LOAD_ALIGN_LOW, TMP_LOW, ADDRESS1) will load the 128-bit operand beginning at address XX00 and ending at address XX0F.

uOP2 (MOVE TMP_ADD, ADDRESS1) sets TMP_ADD equal to ADDRESS1, and uOP3 (LOAD_ALIGN_HIGH, TMP_HIGH, TMP_ADD+15) adds 15 to TMP_ADD. Therefore, when uOP3 is executed, an aligned 128-bit operand is loaded that begins at TMP_ADD+15, in this example, loading a 16-byte aligned operand that begins at address XX10 and ends at address XX1F in cache 12.

uOP1 and uOP3 also include shift operations that are performed on the first and second operand, respectively. These shift operations are performed by the load converter 57 of FPU 56. uOP1 shifts the first operand right by a number of bytes equal to LSB4 of ADDRESS1, and stores the shifted operand in the first temporary register, TMP_LOW. uOP3 shifts the second operand left by a number of bytes equal to 15 minus LSB4 of TMP_ADD+15, and stores the second shifted operand in the second temporary register, TMP_HIGH.

uOP4 (OR XMM7, TMP_LOW, TMP HIGH) merges the two shifted operands together using an OR 98 function. uOP4 also stores the merged operand into the register specified by the LDQQU instruction, in this case, XMM7.

In an embodiment the value used to increment the address used in uOP3 is 15 (TMP_ADD+15), which is one less than the number of bytes loaded (16) by each load instruction (uOP1 and uOP3).

Another instruction that may be executed by processor 10 is a MOVDQU instruction. The MODQU instruction may specify a 128-bit unaligned load. Similar to LDDQU, MOVDQU causes two consecutive uloads to be performed to obtain the specified operand. However, in the case of MOVDQU, two quad-word uloads (64-bits long) are performed, either (or both) of which can be performed as un-aligned uloads from cache 12. In some cases, a series of MOVDQU instructions are issued and cause a series of of substantially uniform unaligned accesses to a cache having 64-byte cache lines. In such a case, there is a significant probability that the operands specified by the MOVDQU will cause the performance of quad-word uloads that are not obtainable from a single cache line. This situation, when a uload cannot obtain an operand from a single cache line is called a cache line split. In processor 10, cache line splits affect the overall processor performance because the hardware must issue and perform two independent uloads: one for the lower part of the cache access (in a first cache line N), and one for the upper part of the cache access (in cache line N+1). For performance reasons, cache line splits are handled completely in hardware, such as by a memory logic block or a cache logic block, and without additional ucode. However, completing caches line splits with memory or cache logic is relatively slow when compared to performing uloads that do not trigger cache line splits. The LDDQU instruction, as described previously, does not perform uloads that cause cache line splits.

In the described embodiment of LDDQU instruction, an address increment value of 15 (see uOP3) is used. Therefore, if a LDDQU instruction included in a set of instructions specifies a load address that is aligned, the address increment of 15 will cause uOP1 and uOP3 to load the same 16-byte operand from cache 12. However, if a LDDQU instruction specifies a memory address that is un-aligned, two different operands will be read from cache 12. The performance of the LDDQU is compatible with the performance of the MOVDQU instruction, so that a set of instructions that use a MOVDQU instruction to perform an un-aligned load may be replaced with an LDDQU instruction. However, as stated before, the execution of the LDDQU instructions is implemented to avoid cache line splits, therefore replacing MOVDQU instructions with LDDQU instructions will improve the performance of a particular set of instructions.

The LDDQU instruction causes the performance of aligned uloads that do not cause cache line splits. Therefore, operands are obtained faster since latencies due to memory or cache alignments are reduced. Also, this way of combining un-aligned operands increases the utilization of the functional logic that is typically included in a load converter and FPU, i.e., floating point functions to shift, logically combine and store operands.

Figure 5:
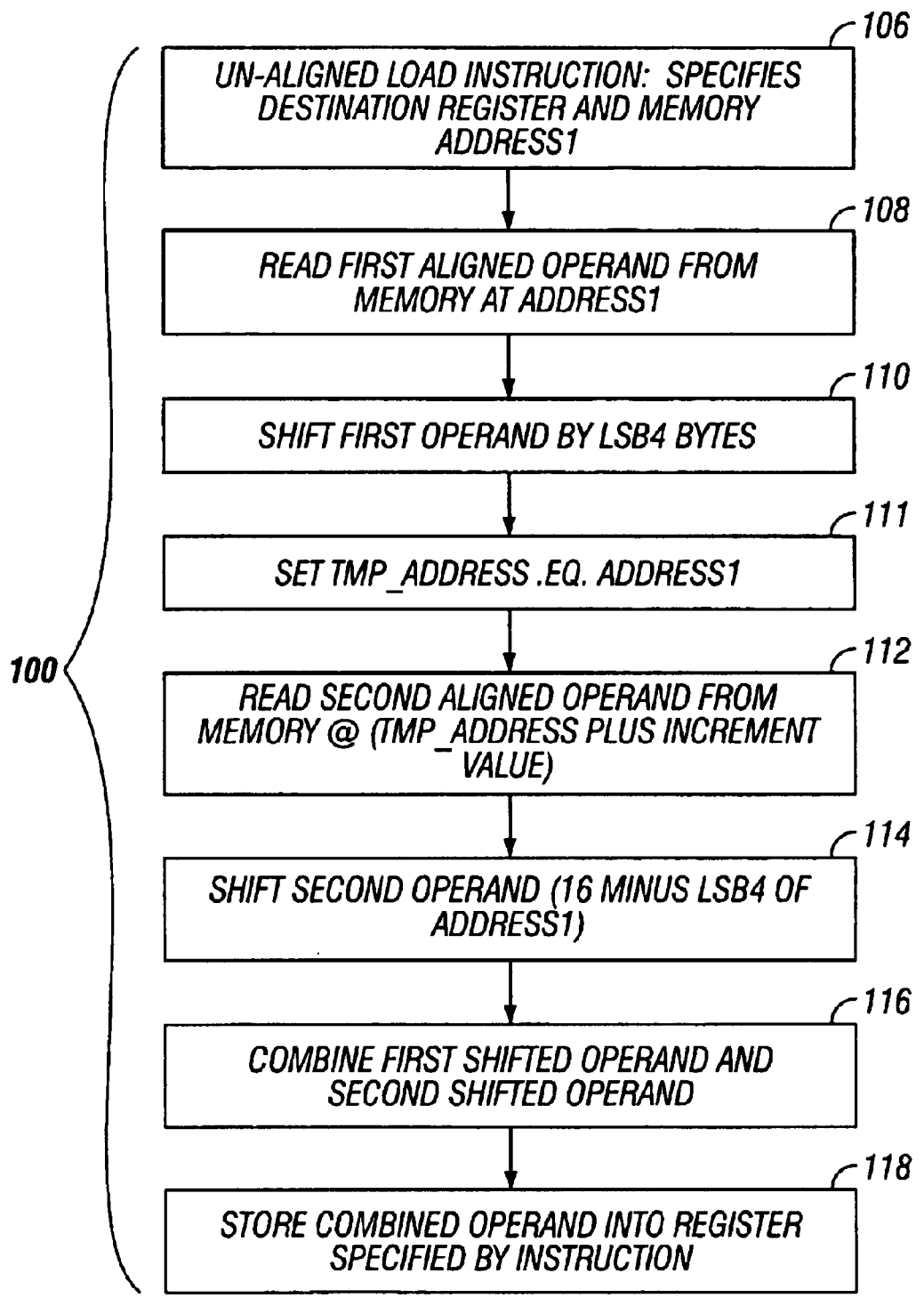
FIG. 5 is a flowchart showing an operand alignment process.

Referring to FIG. 5, a process 100 is shown. Process 100 corresponds to an un-aligned load instruction (106) that specifies a destination register for storing an aligned operand and also specifies a memory address. Process 100 reads (108) a first aligned operand from memory at ADDRESS1, and shifts (110) the first operand by a number of bytes equal to LSB4 of ADDRESS1. Process 100 sets (111) a TMP_ADDRESS equal to ADDRESS1, reads (112) a second aligned operand from memory at an incremented TMP_ADDRESS, and shifts (114) the second operand by a number of bytes equal to 16 minus LSB4 of ADDRESS1. Process 100 combines (116) the first shifted operand and the second shifted operand, and stores (118) the combined operand into the register specified by the un-aligned load instruction.

The invention is not limited to the specific embodiments described above. For example, the merging of the first operand and the second operand read from a memory device may be completed in the integer processing unit 53, rather than in the FPU 56. Also, merging operands may be performed with logical functions other than an "OR" function. The LDDQU instruction may load operands from other memory devices, such as a main memory, a first level cache or higher level cache. Also, the LDDQU instruction may use any appropriate register to store operands before and after the operands are shifted and merged together. The cache line size of 64-bytes, and the load sizes of 128-bit operands could both be modified to perform loads from caches or memories that are configured with different sizes. Also, if the load sizes were different, the shift amounts could be determined by using more or less of the least significant bits of the address specified in an unaligned load instruction.

Accordingly, other embodiments are within the scope of the following claims.

What is claimed is:

1. A method of obtaining an operand from a memory device, the method comprising:
    reading a first operand from a first location in a memory device, the first operand including part of the operand specified by an instruction;

shifting the first operand by a first shift amount;

reading a second data operand from the memory device, the second operand having part of the operand specified by the instruction;

shifting the second operand by a second shift amount; and combining the first shifted data entry and the second shifted data entry to produce an aligned operand, wherein shifting the first operand and shifting the second operand is performed by a shifter also used for floating point functions.

2. The method of claim 1, wherein the instruction specifies an address of the operand, the method further comprising:

incrementing the address by an increment amount, wherein reading the second data operand comprises reading the second operand from a second location that corresponds to the incremented address.

3. The method of claim 2, wherein the increment amount is less than the number of bytes contained in the first operand.

4. The method of claim 3, wherein the second operand and the first operand are read from the same location in the memory device.

5. The method of claim 2, wherein the first operand and the second operand are shifted in opposite directions by a number of bytes specified by the first shift amount and the second shift amount.

6. The method of claim 5, wherein one of the first shift amount and the second shift amount is equal to a value of a specific number of least significant bits of the address, and wherein the other of the first shift amount and the second shift amount is equal to the number of bytes included in the operand minus that value.

7. The method of claim 3, wherein the memory device comprises a cache memory that includes a plurality of cache lines, and wherein the first operand and the second operand are each read from a single cache line of the cache memory.

8. The method of claim 3, wherein combining comprises:

logically combining the bits of the first shifted entry and the second shifted entry together.

9. The method of claim 8, wherein combining the first shifted operand and the second shifted operand is performed by hardware also used for floating point operations.

10. The method of claim 9, wherein logically combining comprises combining with an OR gate.

11. An article comprising a machine-readable medium that stores machine-executable instructions for obtaining an operand from a memory device, the instructions causing a machine to:

read a first operand from a first location in a memory device, the first operand including part of the operand specified by an instruction;

shift the first operand by a first shift amount;

read a second data operand from the memory device, the second operand having part of the operand specified by the instruction;

shift the second operand by a second shift amount; and combine the first shifted data entry and the second shifted data entry to produce an aligned operand, wherein shifting the first operand and shifting the second operand is performed by a shifter also used for floating point functions.

12. The article of claim 11, wherein one of the machine-executable instructions specifies an address of the operand causing a machine to:

increment the address by an increment amount, wherein reading the second data operand comprises reading the second operand from a second location that corresponds to the incremented address.

13. The article of claim 12, wherein the increment amount is less than the number of bytes contained in the first operand.

14. The article of claim 13, wherein the second operand and the first operand are read from the same location in the memory device.

15. The article of claim 12, wherein the first operand and the second operand are shifted in opposite directions by a number of bytes specified by the first shift amount and the second shift amount.

16. The article of claim 15, wherein one of the first shift amount and the second shift amount is equal to a value of a specific number of least significant bits of the address, and wherein the other of the first shift amount and the second shift amount is equal to the number of bytes included in the operand minus that value.

17. The article of claim 13, wherein the memory device comprises a cache memory that includes a plurality of cache lines, and wherein the first operand and the second operand are each read from a single cache line of the cache memory.

18. The article of claim 13, wherein combining comprises logically combining the bits of the first shifted entry and the second shifted entry together.

19. The article of claim 18, wherein combining the first shifted operand and the second shifted operand is performed by hardware also used for floating point operations.

20. The article of claim 19, wherein logically combining comprises combining with an OR gate.

21. A computer instruction comprises:

a load un-aligned operand instruction that causes a processor to:

read a first operand from a first location in a memory device, the first operand including part of the operand specified by an instruction;

shift the first operand by a first shift amount;

read a second data operand from the memory device, the second operand having part of the operand specified by the instruction;

shift the second operand by a second shift amount; and combine the first shifted data entry and the second shifted data entry to produce an aligned operand, wherein shifting the first operand and shifting the second operand is performed by a shifter also used for floating point functions.

22. The instruction of claim 21 further comprising:

a source address field; and a destination register, wherein the destination register is 129-bits wide.

23. The instruction of claim 22 in which the source address specifies a memory device having multiple lines of data.

24. The instruction of claim 23 in which the source address specifies a memory device that is wider than the 128-bits.

* * * * *